United States Patent
Liu et al.

(10) Patent No.: US 11,304,222 B2
(45) Date of Patent: Apr. 12, 2022

(54) METHOD AND APPARATUS FOR UPLINK SCHEDULING

(71) Applicant: Telefonaktiebolaget LM Ericsson (publ), Stockholm (SE)

(72) Inventors: Jinhua Liu, Beijing (CN); Gen Li, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 189 days.

(21) Appl. No.: 16/072,411

(22) PCT Filed: Nov. 17, 2017

(86) PCT No.: PCT/CN2017/111596
§ 371 (c)(1),
(2) Date: Jul. 24, 2018

(87) PCT Pub. No.: WO2019/095266
PCT Pub. Date: May 23, 2019

(65) Prior Publication Data
US 2020/0053760 A1  Feb. 13, 2020

(51) Int. Cl.
*H04W 72/12* (2009.01)
*H04W 74/08* (2009.01)

(52) U.S. Cl.
CPC ... *H04W 72/1289* (2013.01); *H04W 74/0808* (2013.01); *H04W 72/1284* (2013.01)

(58) Field of Classification Search
CPC ......... H04W 72/1289; H04W 72/1284; H04W 74/0808
See application file for complete search history.

(56) References Cited

U.S. PATENT DOCUMENTS

| | | | |
|---|---|---|---|
| 10,218,558 B2* | 2/2019 | Dinan | H04L 5/0044 |
| 10,602,529 B2* | 3/2020 | Babaei | H04W 72/10 |
| 2011/0116428 A1* | 5/2011 | Seong | H04W 28/06 |
| | | | 370/311 |
| 2014/0362780 A1* | 12/2014 | Malladi | H04W 16/14 |
| | | | 370/329 |
| 2015/0071220 A1 | 3/2015 | Luo et al. | |

(Continued)

FOREIGN PATENT DOCUMENTS

| | | |
|---|---|---|
| CN | 106899395 A | 6/2017 |
| EP | 3133888 A1 | 2/2017 |

(Continued)

OTHER PUBLICATIONS

International Search Report and Written Opinion for International Patent Application No. PCT/CN2017/111596, dated Aug. 6, 2018, 10 pages.

(Continued)

*Primary Examiner* — Min Jung
(74) *Attorney, Agent, or Firm* — Christopher & Weisberg, P. A.

(57) ABSTRACT

Embodiments of the present disclosure provide a method, apparatus and computer program product for uplink scheduling. A method implemented at a base station comprises generating a plurality of candidate uplink grants with different frequency resources in an unlicensed spectrum scheduled for uplink transmission of a terminal device and transmitting the plurality of candidate uplink grants to the terminal device. With embodiments of the disclosure, the efficiency of the uplink scheduling can be improved.

20 Claims, 11 Drawing Sheets

(56) References Cited

U.S. PATENT DOCUMENTS

| | | | |
|---|---|---|---|
| 2015/0139175 A1* | 5/2015 | Ratasuk | H04L 5/0007 |
| | | | 370/330 |
| 2017/0013565 A1* | 1/2017 | Pelletier | H04W 52/365 |
| 2017/0118766 A1* | 4/2017 | Baek | H04W 72/1268 |
| 2017/0127442 A1* | 5/2017 | Sun | H04L 5/0055 |
| 2017/0318594 A1* | 11/2017 | Babaei | H04W 72/087 |
| 2017/0374686 A1* | 12/2017 | Agarwal | H04W 74/0833 |
| 2018/0255578 A1* | 9/2018 | Kim | H04L 5/001 |
| 2018/0352564 A1* | 12/2018 | Ye | H04W 72/0413 |
| 2019/0090235 A1* | 3/2019 | Hu | H04W 72/14 |
| 2019/0159253 A1* | 5/2019 | Koorapaty | H04W 74/0808 |
| 2019/0200386 A1* | 6/2019 | Yang | H04W 74/0816 |
| 2020/0221468 A1* | 7/2020 | Babaei | H04W 72/10 |
| 2020/0236709 A1* | 7/2020 | Park | H04W 74/0866 |
| 2020/0260499 A1* | 8/2020 | Sarkis | H04W 74/004 |
| 2020/0280859 A1* | 9/2020 | Kim | H04W 74/08 |
| 2020/0337088 A1* | 10/2020 | Babaei | H04W 74/0891 |

FOREIGN PATENT DOCUMENTS

| | | |
|---|---|---|
| WO | 2013167748 A1 | 11/2013 |
| WO | 2016120360 A1 | 8/2016 |
| WO | 2017128045 A1 | 8/2017 |
| WO | 2017194465 A1 | 11/2017 |

OTHER PUBLICATIONS

Extended European Search Report for European Patent Application No. 17932501.4, dated Jun. 9, 2021, 10 pages.

* cited by examiner

METHOD AND APPARATUS FOR UPLINK SCHEDULING

This application is a 35 U.S.C. § 371 national phase filing of International Application No. PCT/CN2017/111596, filed Nov. 17, 2017, the disclosure of which is incorporated herein by reference in its entirety.

TECHNICAL FIELD

The non-limiting and exemplary embodiments of the present disclosure generally relate to the technical field of wireless communications, and specifically to methods, apparatuses and computer programs for uplink (UL) scheduling.

BACKGROUND

This section introduces aspects that may facilitate a better understanding of the disclosure. Accordingly, the statements of this section are to be read in this light and are not to be understood as admissions about What is in the prior all or what is not in the prior art.

With development of wireless communication, an LTE (Long Term Evolution) system may be operated in unlicensed spectrums, e.g. 2.4 GHz or 5 GHz, etc. Such the LTE system may also be referred to as Licensed Assisted Access (LAA)-LTE system. As known, the LAA-LTE system supports Listen Before Talk (LBT) scheme for channel access. LBT scheme is a kind of carrier sensing scheme. Before accessing a channel or carrier in the unlicensed spectrum, a wireless communication device shall firstly determine that the channel is available via sensing the channel. If the channel is determined not available, the wireless communication device shall not access the channel.

In an LTE system, for uplink transmission, user equipment (UE) may send a scheduling request (SR) to a base station serving the UE when it needs to transmit data. The base station may send uplink scheduling information to the UE upon receipt of the SR. The uplink scheduling information may be sent in UL grant and may include time and frequency resources scheduled for the uplink transmission of the UE. After receiving the UL grant, the UE may determine when and on which channel or carrier it can transmit UL data. Then the UE may perform the LBT scheme on that channel or carrier. If the channel or carrier is available, the UE may transmit the UL data on the channel or carrier. Otherwise, the UE cannot transmit the UL data on the channel or carrier.

To facilitate understanding, the LBT scheme for the LAA-LTE system will be briefly described below as references.

An evolved NodeB (eNB) of the LAA-LTE system may conduct a transmission including Physical Downlink Shared Channel (PDSCH) on a channel on which LAA Secondary cell(s) (Scell(s)) transmission(s) are performed, after first sensing the channel to be idle during the slot durations of a defer duration $T_d$, and after the counter N is zero in Step 4 below. The counter N is adjusted by sensing the channel for additional slot durations) according to the steps below:

Step 1: Set N=$N_{init}$, where $N_{init}$ is a random number uniformly distributed between 0 and $CW_p$, and go to Step 4. $CW_p$ is the contention window and is limited as $CW_{min,p} \leq CW_p \leq CW_{max,p}$, $CW_{min,p}$ and $CW_{max,p}$ are chosen before Step 1;

Step 2: If N>0 and the eNB chooses to decrement the counter, set N=N−1;

Step 3: Sense the channel for additional slot duration, and if the additional slot duration is idle, go to Step 4, else go to Step 5;

Step 4: If N=0, stop, else go to Step 2;

Step 5: Sense the channel during the slot durations of an additional defer duration $T_d$;

Step 6: If the channel is sensed to be idle during the slot durations of the additional defer duration $T_d$ go to Step 2, else go to Step 5.

If the eNB has not finished a transmission including PDSCH on a channel on which LAA Scell(s) transmission(s) are performed after Step 4 in the procedure above, the eNB may transmit a transmission including PDSCH on the channel, after sensing the channel to be idle at least in the slot durations of an additional defer duration.

The defer duration $T_d$ consists of duration 16 µs≤$T_f$≤16 µs+$T_s$ immediately followed by $m_p$ consecutive slot durations where each slot duration is 9 µs≤$T_{sl}$≤9 µs+$T_s$, and $T_f$ includes an idle slot duration $T_{sl}$ at start of $T_f$, $m_p$, $CW_{min,p}$, and $CW_{max,p}$ are based on channel access priority class associated with the eNB transmission, as shown in Table 1.

TABLE 1

| Channel Access Priority Class | | | | | |
|---|---|---|---|---|---|
| Channel Access Priority Class (p) | $m_p$ | $CW_{min,p}$ | $CW_{max,p}$ | $T_{mcot,p}$ | Allowed $CW_p$ sizes |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A slot duration $T_{sl}$ is considered to be idle if the eNB senses the channel during the slot duration, and the power detected by the eNB for at least 4 µs within the slot duration is less than energy detection threshold $X_{Thresh}$. Otherwise, the slot duration $T_{sl}$ is considered to be busy.

If the eNB transmits discovery signal transmission(s) not including PDSCH when N>0 in the procedure above, the eNB shall not decrement N during the slot duration(s) overlapping with discovery signal transmission.

The eNB shall not continuously transmit on a channel on which the LAA Scell(s) transmission(s) are performed, for a period exceeding $T_{mcot,p}$ as given in Table 1. The value of p is determined by the traffic priority class. The high traffic priority class corresponds to a small p, which means a short LBT duration is applied.

For p=3 and p=4 (e.g. video traffic, web browsing or FTP), if the absence of any other technology sharing the carrier can be guaranteed on a long term basis (e.g. by level of regulation), $T_{mcot,p}$=10 ms, otherwise, $T_{mcot,p}$=8 ms.

A New Radio (NR) system may also be operated in the unlicensed spectrums. Therefore the carrier sensing scheme such as the LBT scheme would be also needed for the channel access and uplink transmission. Currently the LBT scheme for NR is not investigated yet in 3GPP. The current LBT scheme for WiFi and LAA-LTE are defined according to the spectrum regulation policies. It is expected that the unlicensed operation of the NR system shall be subject to similar rules for the LAA-LTE system.

SUMMARY

Various embodiments of the present disclosure mainly aim at providing methods, apparatus and computer programs for uplink scheduling in the unlicensed spectrums. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a base station. The method comprises generating a plurality of candidate uplink grants with different frequency resources in an unlicensed spectrum scheduled for uplink transmission of a terminal device and transmitting the plurality of candidate uplink grants to the terminal device.

In some embodiments, the method may further comprise configuring the terminal device with a multi-grant selection scheme which provides a policy for selecting an appropriate uplink grant from the candidate uplink grants based on one or more of: a total payload size of the candidate uplink grant, a sensed channel power of the frequency resource, a radio quality of the frequency resource, a transmit power of the terminal device, buffered data of the terminal device, and a channel index of the frequency resource.

In some embodiments, the multi-grant selection scheme may be indicated in radio resource control signaling.

In some embodiments, each of the candidate uplink grants may be assigned with a priority.

In some embodiments, the candidate uplink grant may comprise a priority indicator indicating the priority.

In some embodiments, the priority of the candidate uplink grant may be indicated by a radio network temporary identifier (RNTI) which is used for transmitting the candidate uplink grant or by a search space in which the candidate uplink grant is transmitted.

In some embodiments, the frequency resources may be partly overlapped.

In some embodiments, each of the frequency resources may be represented by a channel.

In some embodiments, the method may further comprise monitoring the uplink transmission according to the plurality of candidate uplink grants.

In some embodiments, the method may further comprise sending, to the terminal device, an indication of enabling or disabling multi-grant scheduling for the uplink transmission.

In some embodiments, the indication may be sent in radio resource control signaling or physical downlink control channel (PDCCH) order or MAC control element (CE).

In some embodiments, the same frequency resource may be scheduled for different terminal devices, and different transmission timings may be set for the uplink transmissions of the different terminal devices on the same frequency resource.

In a second aspect of the disclosure, there is provided a method implemented at a terminal device. The method comprises receiving a plurality of candidate uplink grants with different frequency resources in an unlicensed spectrum scheduled for uplink transmission and performing a carrier sensing on at least one frequency resource of the candidate uplink grants, to determine at least one available frequency resource. The method also comprises selecting one or more appropriate uplink grants from at least one candidate uplink grant with the at least one available frequency resource and transmitting data according to the selected one or more appropriate uplink grants.

In some embodiments, the method may further comprise receiving a multi-grant selection scheme which provides a policy for selecting an appropriate uplink grant from the candidate uplink grants based on one or more of a total payload size of the candidate uplink grant, a sensed channel power of the frequency resource, a radio quality of the frequency resource, a transmit power of the terminal device, buffered data of the terminal device, and a channel index of the frequency resource. In one embodiment, the selecting of the one or more appropriate uplink grants may be based on the multi-grant selection scheme.

In some embodiments, the multi-grant selection scheme may be received in radio resource control signaling.

In some embodiments, selecting one or more appropriate uplink grants may comprise determining a priority of the at least one candidate uplink grant and selecting the one or more appropriate uplink grants from the at least one candidate uplink grants in a descending order of the priority.

In some embodiments, determining a priority of the at least one candidate uplink grant may comprise extracting a priority indicator from the at least one candidate uplink grant.

In some embodiments, determining a priority of the at least one candidate uplink grant may comprise determining a respective radio network temporary identifier (RNTI) which is used for transmitting the at least one candidate uplink grant and determining the priority corresponding to the RNTI.

In some embodiments, determining a priority of the at least one candidate uplink grant may comprise determining a respective search space in which the at least one candidate uplink grant is transmitted and determining the priority corresponding to the search space.

In some embodiments, the frequency resources may be partly overlapped.

In some embodiments, each of the frequency resources may be represented by a channel.

In some embodiments, the method may further comprise receiving an indication of enabling or disabling multi-grant scheduling for the uplink transmission and enabling or disabling the multi-grant scheduling according to the indication.

In some embodiments, the indication may be received in radio resource control signaling or physical downlink control channel (PDCCH) order or MAC control element (CE).

In a third aspect of the disclosure, there is provided an apparatus in a base station. The apparatus may comprise a processor and a memory. The memory may contain instructions executable by the processor, whereby the apparatus is operative to generate a plurality of candidate uplink grants with different frequency resources in an unlicensed spectrum scheduled for uplink transmission of a terminal device and to transmit the plurality of candidate uplink grants to the terminal device.

In a fourth aspect of the disclosure, there is provided an apparatus in a terminal device. The apparatus may comprise a processor and a memory. The memory may contain instructions executable by the processor, whereby the apparatus is operative to receive a plurality of candidate uplink grants with different frequency resources in an unlicensed spectrum scheduled for uplink transmission, to perform a carrier sensing on at least one frequency resource of the candidate uplink grants to determine at least one available frequency resource, to select one or more appropriate uplink grants from at least one candidate uplink grant with the at least one available frequency resource, and to transmit data according to the selected one or more appropriate uplink grants.

In a fifth aspect of the disclosure, there is provided an apparatus in a base station. The apparatus may comprise a generator configured to generate a plurality of candidate uplink grants with different frequency resources in an unlicensed spectrum scheduled for uplink transmission of a terminal device and a transmitter configured to transmit the plurality of candidate uplink grants to the terminal device.

In a sixth aspect of the disclosure, there is provided an apparatus in a terminal device. The apparatus may comprise a receiver configured to receive a plurality of candidate uplink grants with different frequency resources in an unlicensed spectrum scheduled for uplink transmission, a performing unit configured to perform a carrier sensing on at least one frequency resource of the candidate uplink grants to determine at least one available frequency resource, a selection unit configured to select one or more appropriate uplink grants from at least one candidate uplink grant with the at least one available frequency resource, and a transmitter configured to transmit data according to the selected one or more appropriate uplink grants.

In a seventh aspect of the present disclosure, there is provided a computer program product being tangibly stored on a computer readable storage medium. The computer program product may include instructions which, when executed on at least one processor, cause the at least one processor to carry out the method according to the first aspect of the disclosure.

In an eighth aspect of the present disclosure, there is provided a computer program product being tangibly stored on a computer readable storage medium. The computer program product may include instructions which, when executed on at least one processor, cause the at least one processor to carry out the method according to the second aspect of the disclosure.

According to the various aspects and embodiments as mentioned above, efficiency of the uplink scheduling in the unlicensed spectrums can be improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
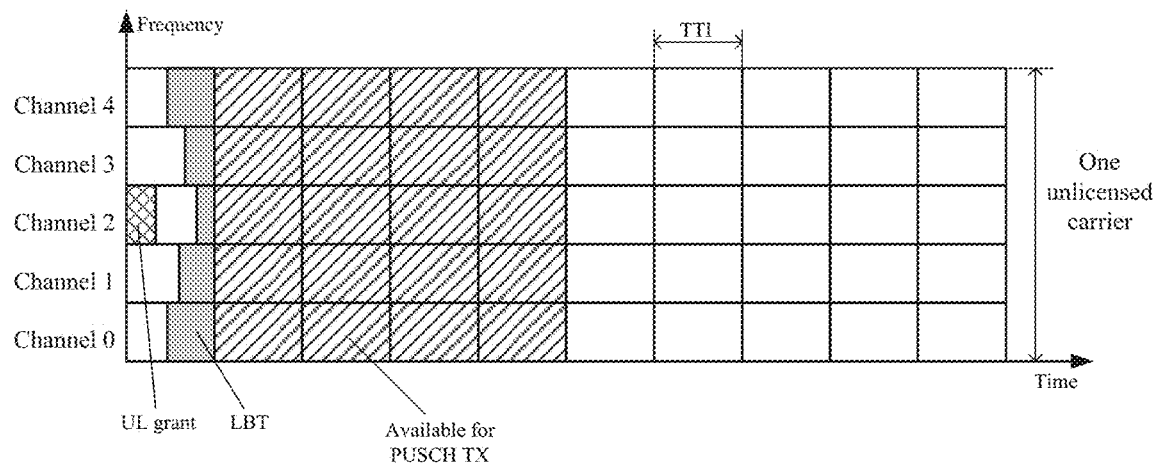
FIG. 1 illustrates an example of scheduling of the UL data transmission in the unlicensed spectrum.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "terminal device". "user equipment" and "UE" may be used interchangeably. Similarly, the term "base station" may represent a node B (NodeB or NB), an evolved NodeB (eNodeB or eNB), a Remote Radio Unit (RRU), a radio head (RH), a remote radio head (RRH), a relay node (RN), a low power node (LPN) such as a femto, a pico, an access point (AP) and so forth.

For illustrative purposes, several embodiments of the present disclosure will be described in the context of a New Radio (NR) system. Those skilled in the art will appreciate, however, that the concept and principle of the several embodiments of the present disclosure may be more generally applicable to other wireless networks, for example a LAA network.

The non-limiting and exemplary embodiments of the present disclosure relate to the uplink scheduling in the unlicensed spectrums.

FIG. 1 shows an example of scheduling of the UL data transmission which may be implemented in the NR system. In this example, the UL data transmission is scheduled on an unlicensed carrier with 100 MHz bandwidth in 5 GHz for example. The unlicensed carrier may comprise 5 channels, Channels 0, 1, 2, 3, and 4, each of which has 20 MHz bandwidth. After receiving, over the Channel 2, the UL grant which indicates the UL data transmission is scheduled on the entire carrier, the UE performs the LBT scheme on each channel. The UL data transmission may be performed over one or more channels which are determined to be available. In this example, all 5 channels are determined to be available. Then the UE may transmit the UL data on any of the channels.

In the scheduling of the UL data transmission, the base station (e.g. eNB of the LTE system, gNB of the NR system) does not know whether the scheduled channel/channels is/are available for the UL data transmission when sending the UL grant. The channel availability is determined by the UE based on the LBT result after receiving the UL grant. Therefore it might happen that the scheduled channel(s) for the UL data transmission of the UE is not available, while the non-scheduled channel(s) is available. But the UE cannot use the non-scheduled channel(s) for the UL data transmission although it is available.

Figure 2:
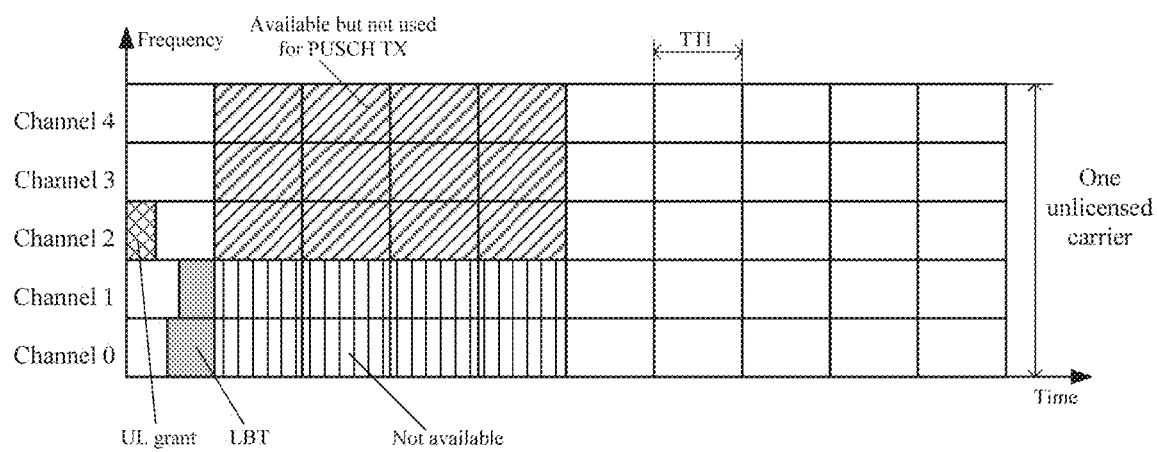
FIG. 2 illustrates another example of scheduling of the UL data transmission in the unlicensed spectrum.

FIG. 2 exemplifies such the case. The gNB schedules a 4-TTI UL data transmission on Channel 0 and Channel 1, according to buffered traffic reported by the UE. The gNB sends the UL grant to the UE over Channel 2. However Channel 0 and Channel 1 are determined to be unavailable after performing the LBT by the UE. Therefore the UE cannot perform the UL data transmission even when Channels 2, 3, 4 are available. 4 TTIs are wasted. In this case, another round of scheduling is needed and the delay for this traffic is increased.

Therefore it is desirable to provide a new UL scheduling scheme in the unlicensed spectrum to improve the efficiency of the UL scheduling.

Figure 3:
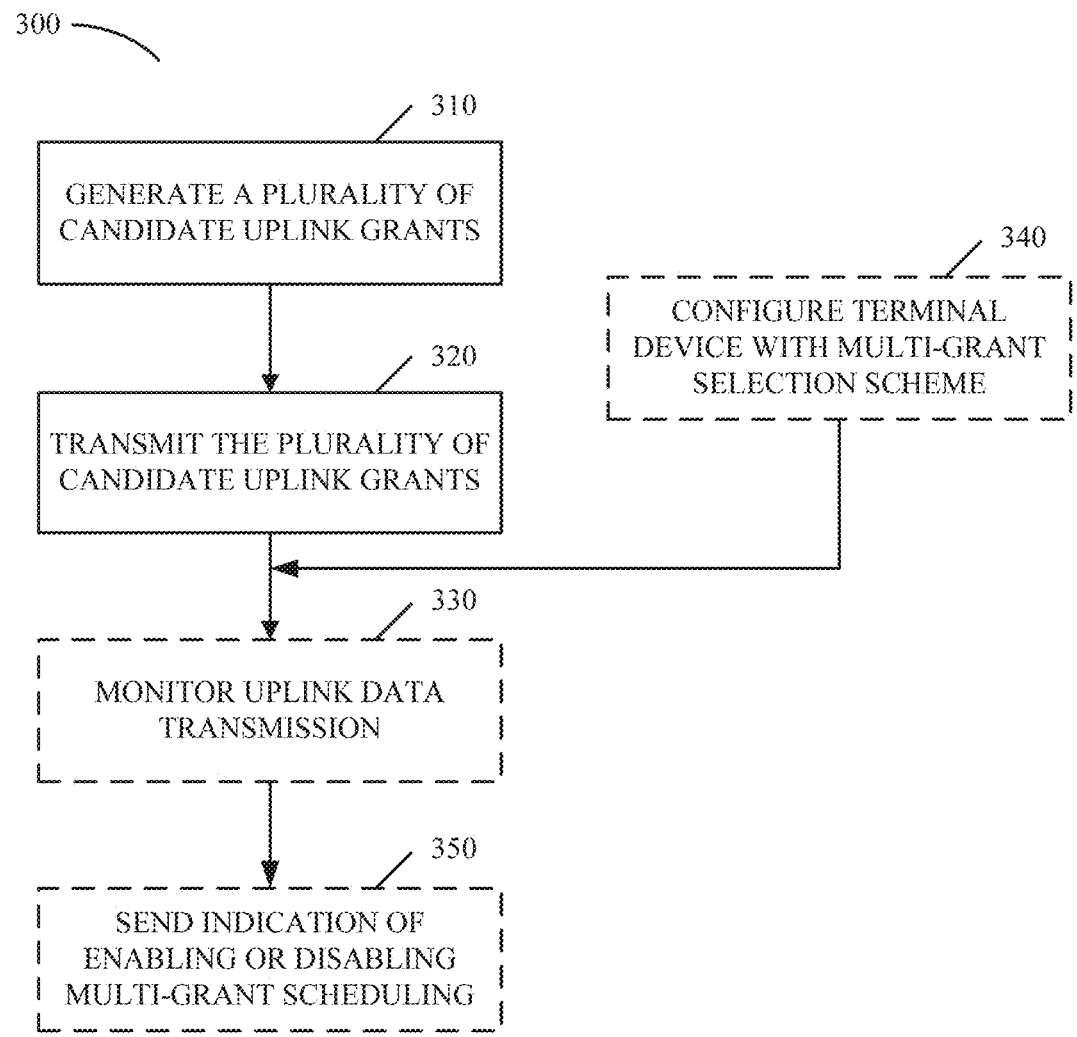
FIG. 3 illustrates a flowchart of a method implemented at a base station according to some embodiments of the present disclosure.

FIG. 3 illustrates a flowchart of a method 300 implemented at a base station according to some embodiments of the present disclosure. The base station may be, for example, an eNB in the LAA-LTE system, or a gNB in the NR system.

As described above, after receiving the SR from the UE, the base station may send the UL grant indicating the time and frequency resources (e.g. in which subframe on which channel) for the uplink data transmission to the UE. The UE may perform the uplink data transmission after determining the channel is available via LBT. In order to improve the channel utility and the efficiency of the UL scheduling, at block 310, the base station may generate a plurality of candidate uplink grants for the uplink transmission of the terminal device. Each of the candidate uplink grants indicates a frequency resource in the unlicensed spectrum scheduled for the uplink transmission. A combination of all the frequency resources indicated by the plurality of candidate uplink grants is sufficient for the uplink transmission. Moreover, each candidate uplink grant also indicates a time resource scheduled for the uplink transmission, for example, which subframes in which the data may be transmitted on the frequency resource.

In an embodiment, the frequency resource may be represented by a channel. For example, the base station may generate two candidate uplink grants, Grant 1 and Grant 2. The Grant 1 may indicate the scheduled frequency resource including two channels, Channel 0 and Channel 1. The Grant 2 may indicate the scheduled frequency resource including two channels, Channel 2 and Channel 3. Optionally, the frequency resources of the candidate uplink grants may be partly overlapped. For example, the base station may generate three candidate uplink grants, Grant 1, Grant 2 and Grant 3. The Grant 1 may indicate the frequency resource including two channels, Channel 0 and Channel 1. The Grant 2 may indicate the frequency resource including two channels, Channel 1 and Channel 2. The Grant 3 may indicate the frequency resource including two channels, Channel 2 and Channel 3.

Then at block 320, the base station transmits the plurality of candidate uplink grants to the terminal device. The terminal device may implement the uplink data transmission according to these candidate uplink grants, which will be described in detail later. Then at block 330, the base station may monitor the uplink transmission from the terminal device according to the candidate uplink grants. In an embodiment, the base station may monitor each of the frequency resource and receive data from the terminal device.

In some embodiments, the base station may further configure the terminal device with a multi-grant selection scheme at block 340, to direct the terminal device to select an appropriate uplink grant. The multi-grant selection scheme may provide a policy for selecting the appropriate uplink grant from the candidate uplink grants. In an embodiment, the selection may be based on a total payload size of the candidate uplink grant. For example, the candidate uplink grant with a larger payload size may be preferably selected. In an embodiment, the selection may be based on a sensed channel power of the frequency resource. For example, the candidate uplink grant whose frequency resource has the lower sensed channel power may be preferably selected. In an embodiment, the selection may be based on a radio quality of the frequency resource. For example, the candidate uplink grant whose frequency resource has a better radio quality may be selected for the data transmission with a higher priority. In an embodiment, the selection may be based on a transmit power of the terminal device. For example, the terminal device may select as many candidate uplink grants as the transmit power can support. In an embodiment, the selection may be based on buffered data of the terminal device. For example, the terminal device may select as many candidate uplink grants as the buffered data can be transmitted one time. In an embodiment, the selection may be based on a channel index of the frequency resource. For example, the terminal device may select the candidate uplink grant in the order of the channel index. A person skilled in the art will appreciate that the policies for selection described above may be used individually or in combination.

In some embodiments, the multi-grant selection scheme may be indicated to the terminal device in radio resource control (RRC) signaling. Alternatively, the multi-grant selection scheme may be predefined in the terminal device.

Alternatively, in some embodiments, each candidate uplink grant may be assigned with a priority, such that the terminal device may select the appropriate uplink grants according to the priority of the candidate uplink grant.

In some embodiments, the priority may be explicitly indicated. In this case, a priority indicator may be included in the candidate uplink grant. The base station may determine the priority of the candidate uplink grant according to a buffer status and a transmit power of the terminal device, for example, and indicate the priority in the priority indicator.

In some embodiments, the priority may be implicitly indicated. In an embodiment, the priority of the candidate uplink grant may be indicated by a radio network temporary identifier (RNTI) which is used for transmitting the candidate uplink grant. In this case, the terminal device may be configured with multiple RNTIs. Each RNTI may correspond to a priority. For example, the candidate uplink grant sent using RNTI 1 may be of a higher priority than another candidate uplink grant using RNTI 2. The base station may indicate a mapping relationship between the RNTIs and the priorities to the terminal device. Alternatively, the mapping relationship may be predefined in the terminal device. In an embodiment, the priority of the candidate uplink grant is indicated by a search space in which the candidate uplink grant is transmitted. In this case, the terminal device may be configured with multiple search spaces. Each search space may correspond to a priority. The base station may indicate a mapping relationship between the search spaces and the priorities to the terminal device. Alternatively, the mapping relationship may be predefined in the terminal device.

Optionally, the plurality of candidate uplink grants may be grouped into multiple sets. The frequency resources of the candidate uplink grants in the same set may have similar characteristics. Then differentiated link adaption may be applied for the frequency resources in the different sets.

Additionally, in some embodiments, the base station may further send to the terminal device an indication of enabling or disabling multi-grant scheduling for the uplink transmission, at block 350. Thus the multi-grant scheduling at the terminal device can be controlled. The indication may be sent in RRC signaling or PDCCH order or MAC CE. For example, a default state of the multi-grant scheduling may be configured via the RRC signaling or predefined.

In some embodiments, the base station may generate the candidate uplink grants for different terminal devices. The candidate uplink grants for the different terminal device may be overlapped. In an embodiment, the same frequency resource may be scheduled for the different terminal devices. To avoid collision, different transmission timings may be set for the uplink transmissions of the different terminal devices on the same frequency resource. Thus the usage of the frequency resource may be improved.

Figure 4:
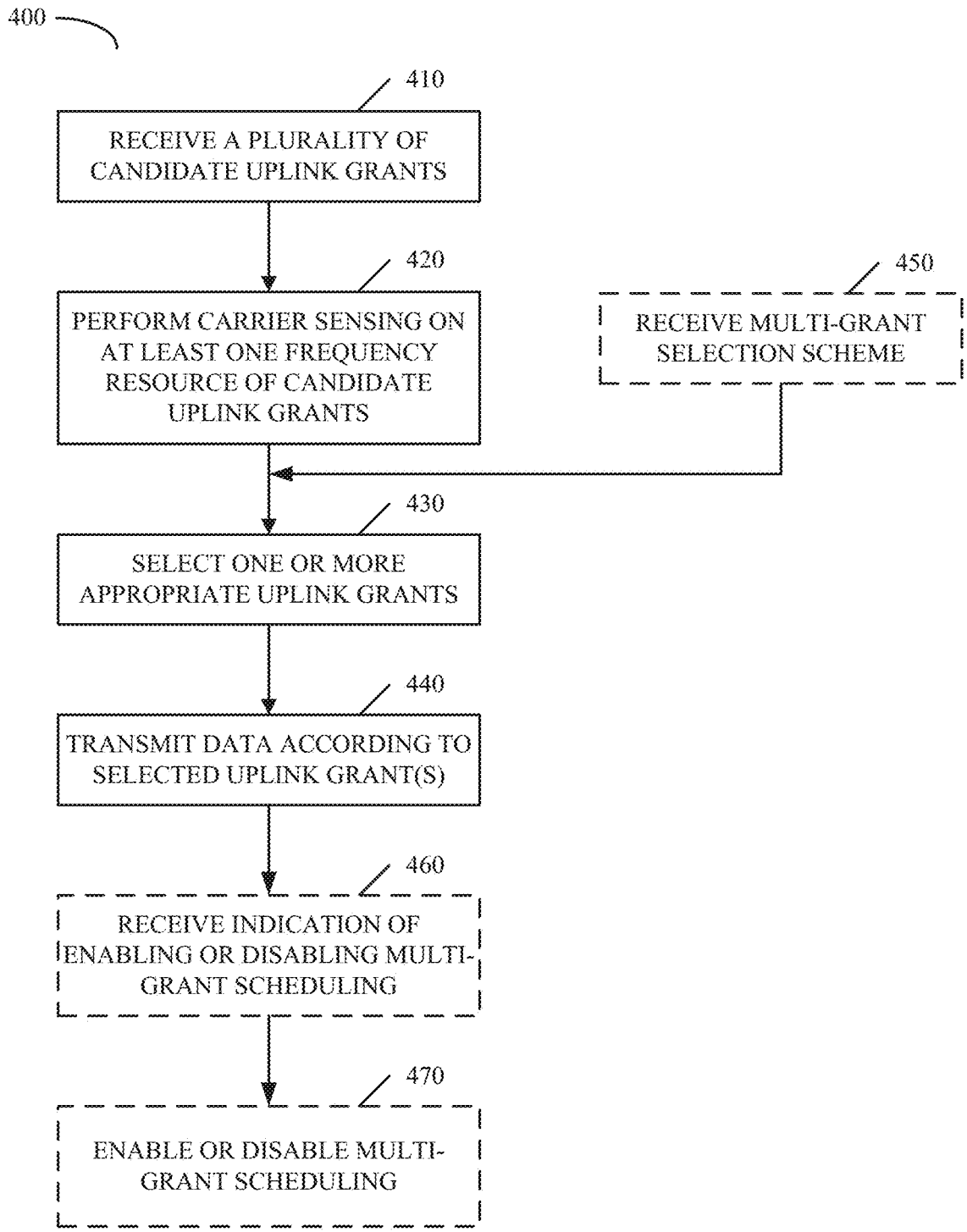
FIG. 4 illustrates a flowchart of a method implemented at a terminal device according to some embodiments of the present disclosure.

FIG. 4 illustrates a flowchart of a method 400 implemented at a terminal device according to some embodiments of the present disclosure. As shown in FIG. 4, the method 400 may comprise: receiving a plurality of candidate uplink grants with different frequency resources in an unlicensed spectrum scheduled for uplink transmission, at block 410; performing a carrier sensing on at least one frequency resource of the candidate uplink grants to determine at least one available frequency resource, at block 420; selecting one or more appropriate uplink grants from at least one candidate uplink grant with the at least one available frequency resource, at block 430; and transmitting data according to the selected one or more appropriate uplink grants, at block 440.

As described above, the terminal device sends the SR to the base station to request scheduling information for the uplink transmission. Then at block 410, the terminal device receives a plurality of candidate uplink grants. Each candidate uplink grant indicates a frequency resource which the base station schedules for the uplink transmission. Also the candidate uplink grant may indicate a time resource which the base station schedules on the frequency resource. In an embodiment, the frequency resource may be represented by a channel. For example, the terminal device may receive two candidate uplink grants, Grant 1 and Grant 2. The Grant 1 may indicate the frequency resource including two channels, Channel 0 and Channel 1. The Grant 2 may indicate the frequency resource including two channels, Chanel 2 and Channel 3.

After receiving the plurality of candidate uplink grants, the terminal device may determine the corresponding frequency resource and time resource from each candidate uplink grant. Then at block 420, the terminal device performs the carrier sensing, i.e. LBT, on each frequency resource to determine whether the frequency resource is available. Accordingly, the terminal device may determine at least one available frequency resource through the carrier sensing.

Then at block 430, the terminal device selects one or more appropriate uplink grants from at least one candidate uplink grant with the at least one available frequency resource. In some embodiments, the terminal device may select the appropriate uplink grant(s) based on some policy or based on a priority of the candidate uplink grants, which will be described in detail later. At block 440, the terminal device may transmit the data according to the selected appropriate uplink grant(s). In this operation, the terminal device may transmit the data on the available frequency resource(s) of the appropriate uplink grant(s) to the base station.

In some embodiments, the terminal device may further receive a multi-grant selection scheme from the base station, at block 450. The multi-grant selection scheme may provide a policy for selecting the appropriate uplink grant(s) from the candidate uplink grants. Then the terminal device may use the multi-grant selection scheme to select the appropriate uplink grants. In an embodiment, the multi-grant selection scheme may be received in the RRC signaling.

According to the multi-grant selection scheme, the selection may be based on one or more of the total payload size of the candidate uplink grant, the sensed channel power of the frequency resource, the radio quality of the frequency resource, the transmit power of the terminal device, the buffered data of the terminal device, and a channel index of the frequency resource. In an embodiment, the terminal device may determine the payload size of the candidate uplink grant with the available frequency resource, and select the candidate uplink grant with larner payload size as the appropriate uplink grant. In an embodiment, the terminal device may select the candidate uplink grant with the lower sensed channel power of the frequency resource as the appropriate uplink grant. In an embodiment, the terminal device may select the candidate uplink grant with a higher radio quality for the data transmission with a higher priority. In an embodiment, the terminal device may select as many candidate uplink grants as the transmit power of the terminal device can support. In an embodiment, the terminal device may select as many candidate uplink grants as the buffered data can be transmitted one time.

In some embodiments, each candidate uplink grant may be assigned with a priority. Thus the terminal device may select the appropriate uplink grant(s) according to the priority of the candidate uplink grant with the available frequency resource. For example, the selection may be performed in a descending order of the priority.

In an embodiment, the priority of the candidate uplink grant may be indicated by a priority indicator which may be included in the candidate uplink grant. In this case, the terminal device may extract the priority indicator from the candidate uplink grant to determine the priority.

In an embodiment, the priority of the candidate uplink grant may be indicated by the RNTI used for transmitting the candidate uplink grant. In this case, the terminal device may be configured with multiple RNTIs. Further the mapping relationship between the RNTIs and the priorities may be preconfigured or predefined for the terminal device. Upon receipt of the candidate uplink grant, the terminal device may determine the corresponding RNTI, and determine the priority corresponding to the RNTI according to the mapping relationship.

In an embodiment, the priority of the candidate uplink grant may be indicated by the search space in which the candidate uplink grant is transmitted. In this case, the terminal device may be configured with multiple search spaces. Further the mapping relationship between the search spaces and the priorities may be preconfigured or predefined for the terminal device. Upon receipt of the candidate uplink grant, the terminal device may determine the corresponding search space, and determine the priority corresponding to the search space according to the mapping relationship.

In some embodiments, the terminal device may further receive an indication of enabling or disabling multi-grant scheduling for the uplink transmission from the base station, at block 460. The indication may be received in the RRC signaling or PDCCH order or MAC CE. Then at block 470, the terminal device may enable or disable the multi-grant scheduling.

With the methods according to the embodiments of the disclosure as shown in FIGS. 3 and 4, the channel utility efficiency can be improved for the terminal device, and thus the efficiency of the uplink transmission can be improved. Further the terminal device can select the appropriate uplink grant according to some predetermined policy or the priority, and the link adaptation gain can be improved. In addition, redundant uplink grants can be provided compared to the buffered data to decrease the transmission delay.

Figure 5:
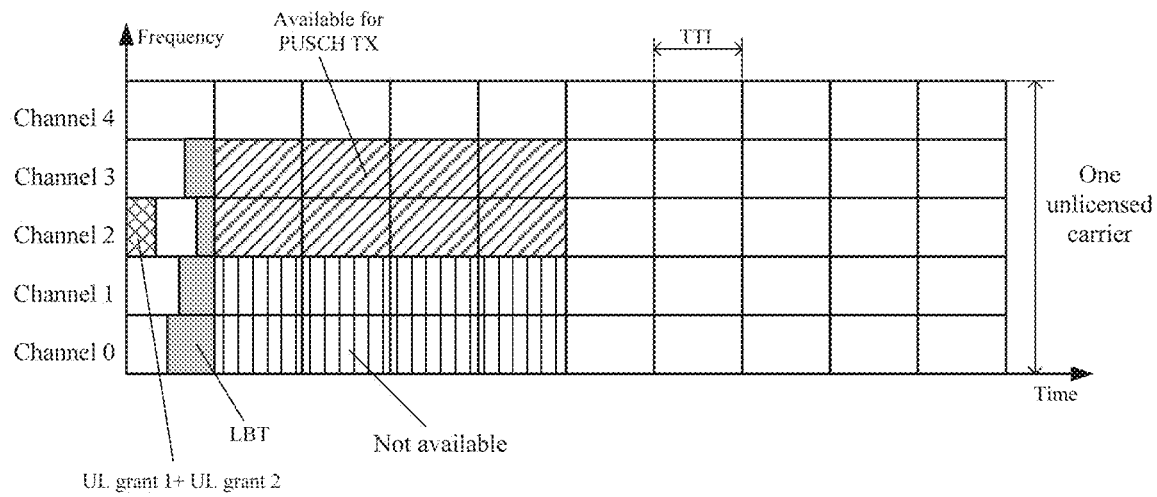
FIG. 5 illustrates an example of scheduling of the UL data transmission implemented by the methods according to the embodiments of the present disclosure.

FIG. 5 illustrates an exemplary scheduling of the UL data transmission implemented according to the embodiments of the disclosure. In this example, the base station sends two candidate uplink grants, UL grant 1 and UL grant 2, to the terminal device. The UL grant 1 indicates that Channel 0 and Channel 1 are scheduled, and is of a high priority. The UL grant 2 indicates that Channel 2 and Channel 3 are scheduled, and is of a low priority. Then the terminal device performs the LBT on each channel, and determines that Channels 0 and 1 are not available and Channels 2 and 3 are available. Thus the terminal device may perform the uplink transmission on the Channels 2 and 3.

Figure 6:
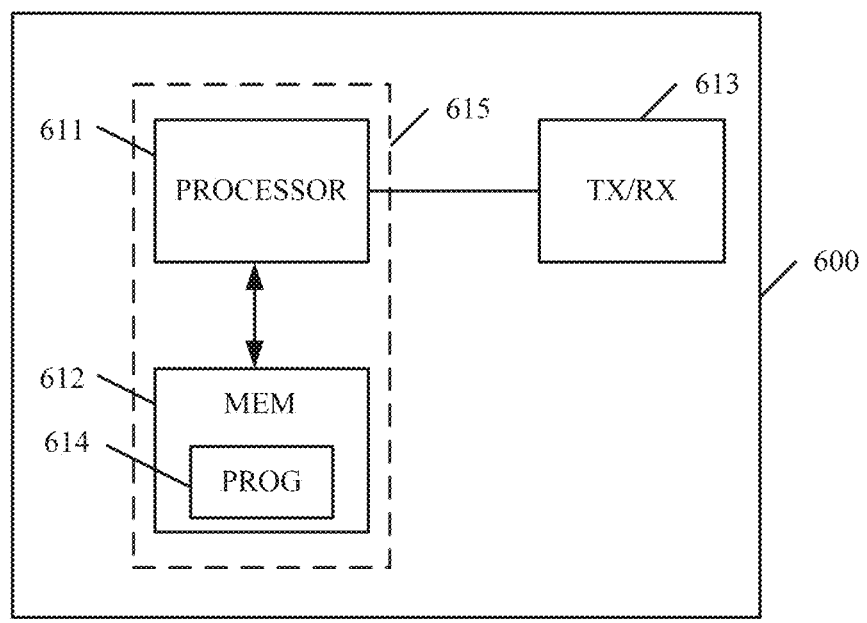
FIG. 6 illustrates a simplified block diagram of an apparatus in a base station according to an embodiment of the present disclosure.

FIG. 6 illustrates a simplified block diagram of an apparatus 600 that may be embodied in/as a base station, e.g., an eNB operating in the LAA-LTE system, or a gNB in the NR system. As shown in FIG. 6, the apparatus 600 comprises at least one processor 611, such as a data processor (DP) and at least one memory (MEM) 612 coupled to the processor 611. The apparatus 600 may further comprise a transmitter TX and receiver RX 613 coupled to the processor 611. The MEM 612 stores program (PROG) 614. The PROG 614 may include instructions that, when executed on the associated processor 611, enable the apparatus 600 to generate a plurality of candidate uplink grants with different frequency resources in an unlicensed spectrum scheduled for uplink transmission of a terminal device and to transmit the plurality of candidate uplink grants to the terminal device. A combination of the at least one processor 611 and the at least one MEM 612 may form processing means 615 adapted to implement various embodiments of the present disclosure.

The processor 611 may be of any type suitable to the local technical environment, and may include one or more of general purpose computers, special purpose computers, microprocessors, digital signal processors DSPs and processors based on multicore processor architecture, as non-limiting examples.

The MEM 612 may be of any type suitable to the local technical environment and may be implemented using any suitable data storage technology, such as semiconductor based memory devices, magnetic memory devices and systems, optical memory devices and systems, fixed memory and removable memory, as non-limiting examples.

In some embodiments, the apparatus 600 may be further operative to configure the terminal device with a multi-grant selection scheme which provides a policy for selecting an appropriate uplink grant from the candidate uplink grants based on one or more of: a total payload size of the candidate uplink grant, a sensed channel power of the frequency resource, a radio quality of the frequency resource, a transmit power of the terminal device, buffered data of the terminal device, and a channel index of the frequency resource.

In some embodiments, each of the candidate uplink grants may be assigned with a priority. In an embodiment, the candidate uplink grant may comprise a priority indicator indicating the priority. In an embodiment, the priority of the candidate uplink grant may be indicated by a RNTI which is used for transmitting the candidate uplink grant or by a search space in which the candidate uplink grant is transmitted.

In some embodiments, the frequency resources may be partly overlapped. In an embodiment, each of the frequency resources is represented by a channel.

In some embodiments, the apparatus 600 may be further operative to monitor the uplink transmission according to the plurality of candidate uplink grants.

In some embodiments, the apparatus 600 may be further operative to send, to the terminal device, an indication of enabling or disabling multi-grant scheduling for the uplink transmission.

In some embodiments, the apparatus 600 may be operative to schedule the same frequency resource for different terminal devices and to set different transmission timings for the uplink transmissions of the different terminal devices on the same frequency resource.

Various embodiments of the present disclosure may be implemented by computer program executable by one or more of the processor 611, software, firmware, hardware or in a combination thereof.

Figure 7:
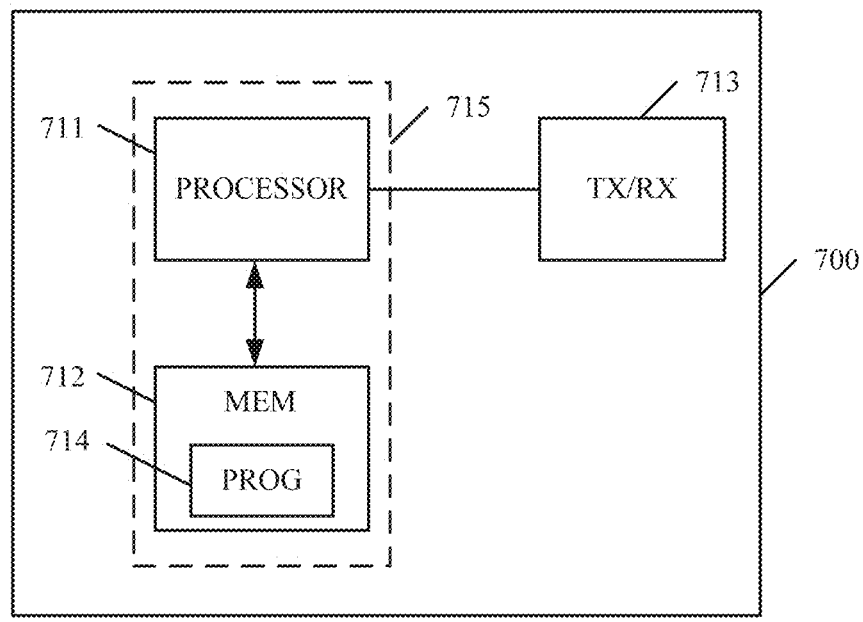
FIG. 7 illustrates a simplified block diagram of an apparatus in a terminal device according to an embodiment of the present disclosure.

FIG. 7 illustrates a simplified block diagram of an apparatus 700 that may be embodied in/as a terminal device, e.g., a user equipment (UE). As shown in FIG. 7, the apparatus 700 comprises at least one processor 711, such as a DP, and at least one MEM 712 coupled to the processor 711. The apparatus 700 may further comprise a suitable TX/RX 713 coupled to the processor 711. The MEM 712 stores PROG 7144. The PROG-714 may include instructions that, when executed on the associated processor 711, enable the apparatus 700 to receive a plurality of candidate uplink grants with different frequency resources in an unlicensed spectrum scheduled for uplink transmission, to perform a carrier sensing on at least one frequency resource of the candidate uplink grants to determine at least one available frequency resource, to select one or more appropriate uplink grants from at least one candidate uplink grant with the at least one available frequency resource, and to transmit data according to the selected one or more appropriate uplink grants. A combination of the at least one processor 711 and the at least one MEM 712 may form processing means 715 adapted to implement various embodiments of the present disclosure.

The processor and 711 may be of any type suitable to the local technical environment, and may include one or more of general purpose computers, special purpose computers, microprocessors, digital signal processors DSPs and processors based on multicore processor architecture, as non-limiting examples.

The MEM 712 may be of any type suitable to the local technical environment and may be implemented using any suitable data storage technology, such as semiconductor based memory devices, magnetic memory devices and systems, optical memory devices and systems, fixed memory and removable memory, as non-limiting examples.

In some embodiments, the apparatus 700 may be further operative to receive a multi-grant selection scheme which provides a policy for selecting an appropriate uplink grant from the candidate uplink grants based on one or more of: a total payload size of the candidate uplink grant, a sensed channel power of the frequency resource, a radio quality of the frequency resource, a transmit power of the terminal device, buffered data of the terminal device, and a channel index of the frequency resource. In an embodiment, the apparatus 700 may be operative to select the one or more appropriate uplink grants based on the multi-grant selection scheme.

In some embodiments, the apparatus 700 may be operative to determine a priority of the at least one candidate uplink grant and to select the one or more appropriate uplink grants from the at least one candidate uplink grant in a descending order of the priority.

In some embodiments, the apparatus 700 may be operative to extract a priority indicator from the at least one candidate uplink grant.

In some embodiment, the apparatus 700 may be operative to determine a respective RNTI which is used to transmit the at least one candidate uplink grant and to determine the priority corresponding to the RNTI. In some embodiments, the apparatus 700 may be operative to determine a respective search space in which the at least one candidate uplink grant is transmitted and to determine the priority corresponding to the search space.

In some embodiment, the apparatus 700 may be further operative to receive an indication of enabling or disabling multi-grant scheduling for the uplink transmission and to enable or disable the multi-grant scheduling according to the indication.

Various embodiments of the present disclosure may be implemented by computer program executable by one or more of the processor 711, software, firmware, hardware or in a combination thereof.

Figure 8:
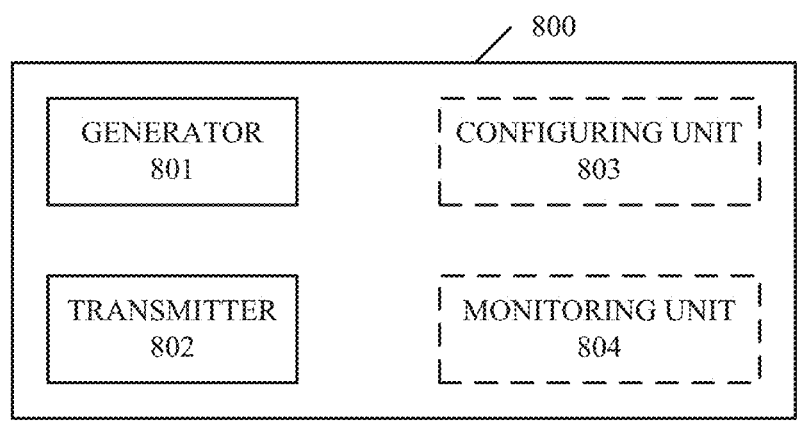
FIG. 8 illustrate a simplified block diagram of an apparatus in a base station according to an embodiment of the present disclosure.

Reference is now made to FIG. 8, which illustrates a schematic block diagram of an apparatus 800 in a base station. The base station may be, for example, an eNB operating in the LAA-LTE system, or a gNB in the NR system. The apparatus 800 is operable to carry out the exemplary method 300 described with reference to FIG. 3 and possibly any other processes or methods. It is also to be understood that the method 300 is not necessarily carried out by the apparatus 800. At least some steps of the method 300 can be performed by one or more other entities.

As shown in FIG. 8, the apparatus 800 may comprise a generator 801 configured to generate a plurality of candidate uplink grants with different frequency resources in an unlicensed spectrum scheduled for uplink transmission of a terminal device and a transmitter 802 configured to send the plurality of candidate uplink grants to the terminal device.

In some embodiments, the apparatus 800 may further comprise a configuring unit 803 configured to configure the terminal device with a multi-grant selection scheme which provides a policy for selecting an appropriate uplink grant from the candidate uplink grants based on one or more of: a total payload size of the candidate uplink grant, a sensed channel power of the frequency resource, a radio quality of the frequency resource, a transmit power of the terminal device, buffered data of the terminal device, and a channel index of the frequency resource.

In some embodiments, the apparatus 800 may further comprise a monitoring unit 804 configured to monitor the uplink transmission according to the plurality of candidate uplink grants.

In some embodiments, the transmitter 802 may be further configured to send, to the terminal device, an indication of enabling or disabling multi-grant scheduling for the uplink transmission.

In some embodiments, the generator 801 may be configured to schedule the same frequency resource for different terminal devices and to set different transmission timings for the uplink transmissions of the different terminal devices on the same frequency resource.

Figure 9:
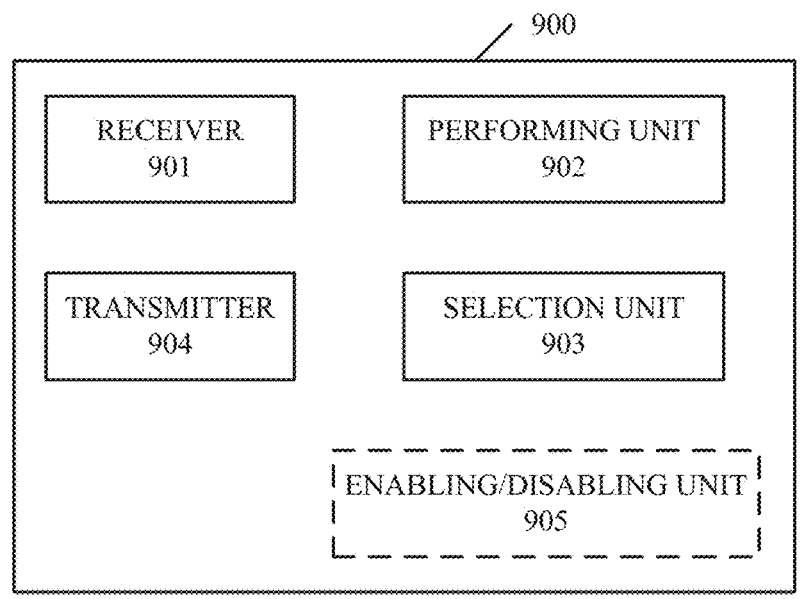
FIG. 9 illustrate a simplified block diagram of an apparatus in a terminal device according to an embodiment of the present disclosure.

Reference is now made to FIG. 9, which illustrates a schematic block diagram of an apparatus 900 in a terminal device. The terminal device may be any type of device capable of wireless communication, and it may also be referred to as UE or terminal. The apparatus 900 is operable to can out the exemplary method 400 described with reference to FIG. 4 and possibly any other processes or methods. It is also to be understood that the method 400 is not necessarily carried out by the apparatus 900. At least some steps of the method 400 can be performed by one or more other entities.

As shown in FIG. 9, the apparatus 900 may comprise a receiver 901 configured to receive a plurality of candidate uplink grants with different frequency resources in an unlicensed spectrum scheduled for uplink transmission a performing unit 902 configured to perform a carrier sensing on the respective frequency resources of the respective candidate uplink grants, to determine at least one available frequency resource; a selection unit 903 configured to select one or more appropriate uplink grants from at least one candidate uplink grant with the at least one available frequency resource; and a transmitter 904 configured to transmit data according to the selected one or more appropriate uplink grants.

In some embodiments, the receiver 901 may be further configured to receive a multi-grant selection scheme which provides a policy for selecting an appropriate uplink grant from the candidate uplink grants based on one or more of: a total payload size of the candidate uplink grant, a sensed channel power of the frequency resource, a radio quality of the frequency resource, a transmit power of the terminal device, buffered data of the terminal device, and a channel index of the frequency resource. The selection unit 903 may be configured to select the one or more appropriate uplink grants based on the multi-grant selection scheme.

In some embodiments, the selection unit 903 may comprise a priority determination unit configured to determine a priority of the at least one candidate uplink grant, and a grant selection unit configured to select the one or more appropriate uplink grants from the at least one candidate uplink grant in a descending order of the priority.

In some embodiments, the priority determination unit may comprise an extraction unit configured to extract a priority indicator from the at least one candidate uplink grant. In some embodiments, the priority determination unit may comprise a RNTI determination unit configured to determine a respective RNTI which is used to transmit the at least one candidate uplink grant, and a determination unit configured to determine the priority corresponding to the RNTI. In some embodiments, the priority determination unit may comprise a search space determination unit configured to determine a respective search space in which the at least one candidate uplink grant is transmitted, and a determination unit configured to determine the priority corresponding to the search space.

In some embodiments, the receiver 901 may be further configured to receive an indication of enabling or disabling multi-grant scheduling for the uplink transmission. The apparatus 900 may further comprise an enabling/disabling unit 905 configured to enable or disable the multi-grant scheduling according to the indication.

Figure 10:
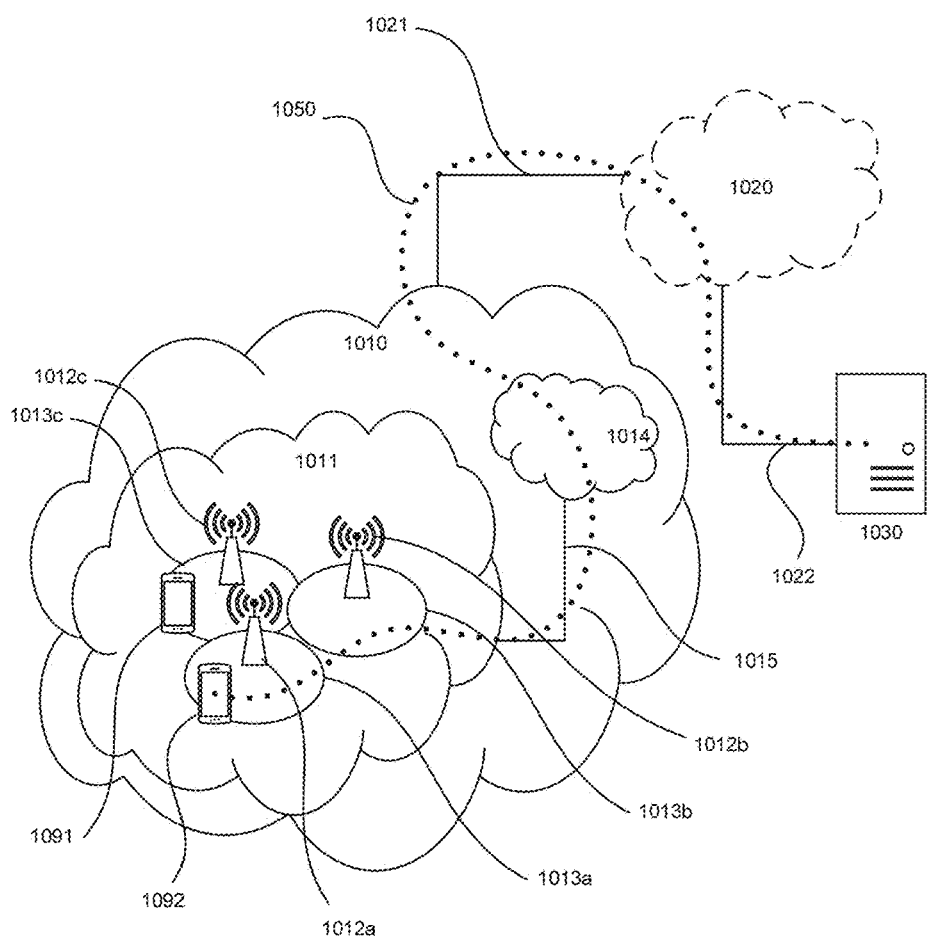
FIG. 10 illustrates a telecommunication network connected via an intermediate network to a host computer according to some embodiments of the present disclosure.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data Which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system anchor through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1230 is currently located. Hardware 1235 of UE 1230 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by LTE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
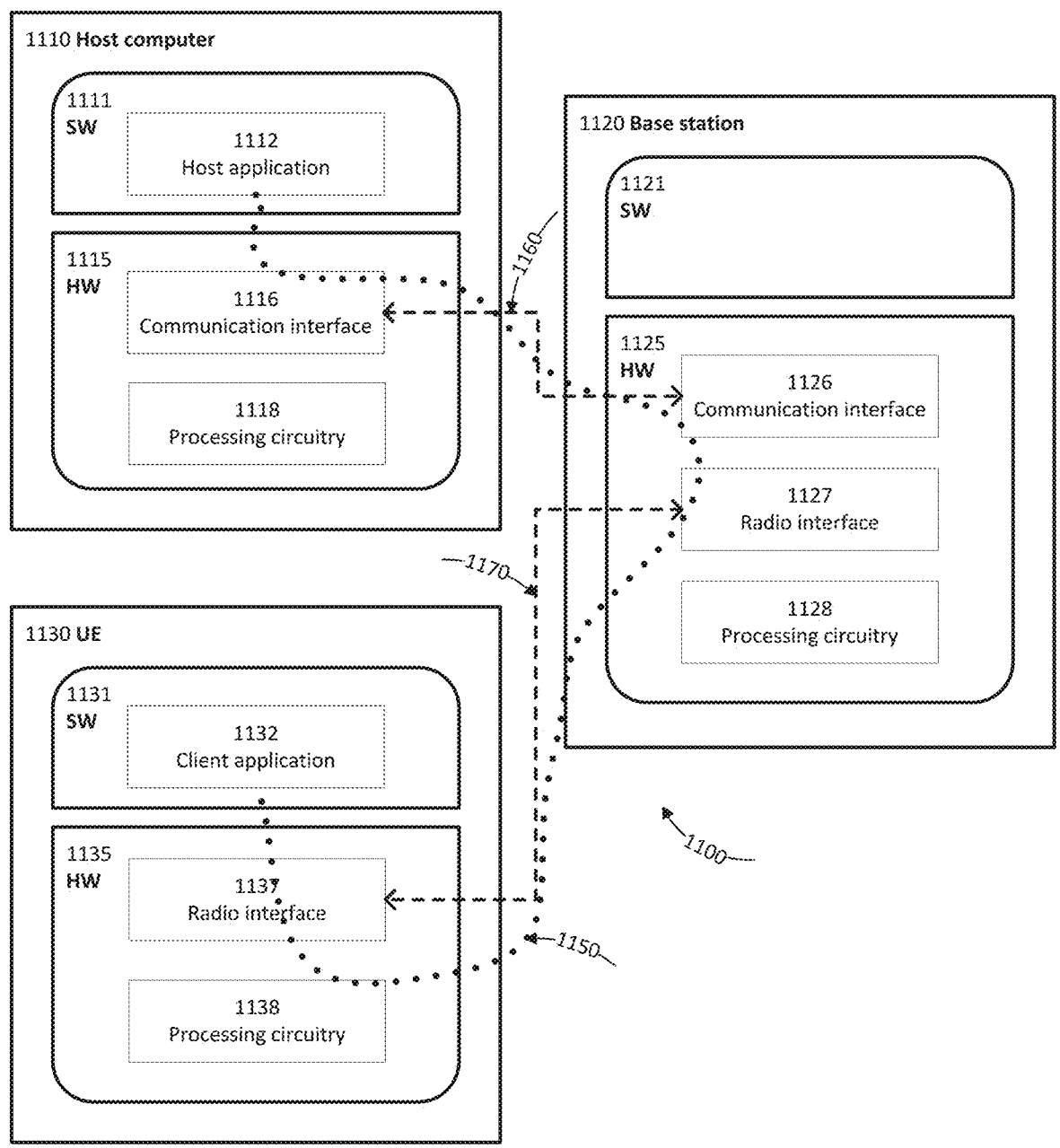
FIG. 11 illustrates a host computer communicating via a base station with a user equipment over a plurality of wireless connection according to some embodiments of the present disclosure.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in Which wireless connection 1170 forms the last segment. More precisely, the teachings of these embodiments may improve the efficiency of the uplink scheduling and reduce the uplink transmission delay, and thereby provide benefits such as high transmission quality and reduced user waiting time.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
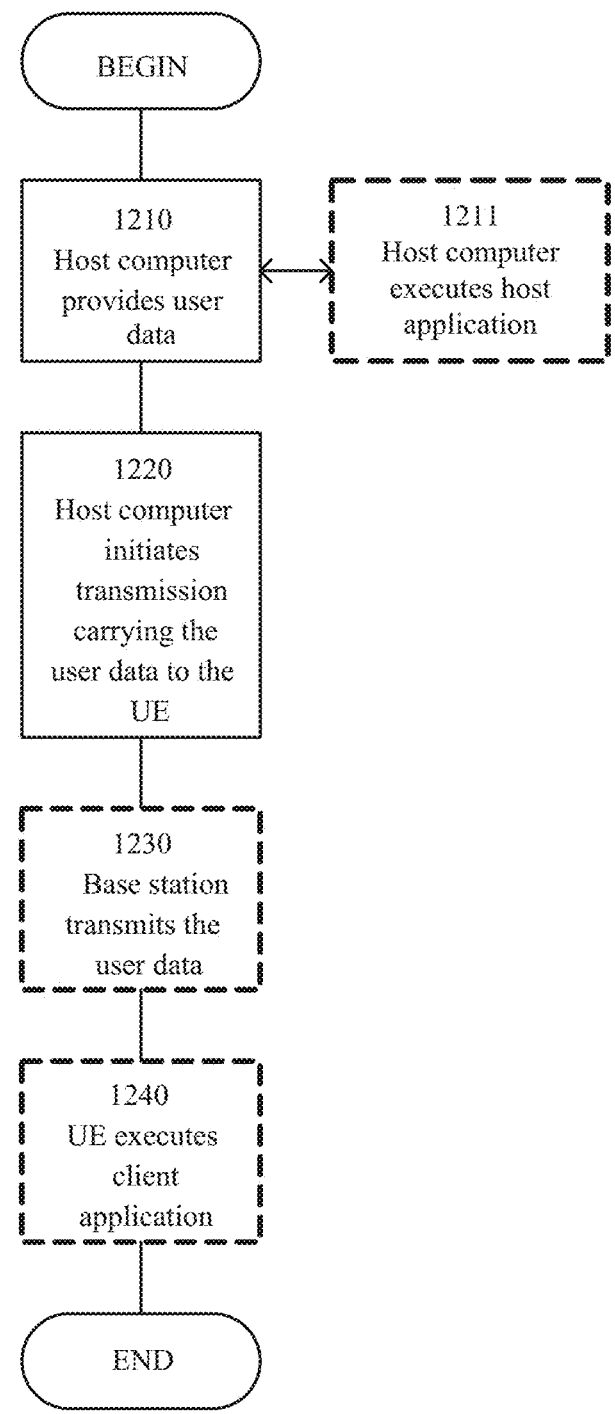
FIG. 12 illustrates a flowchart of methods in a communication system including a host computer, a base station and a user equipment according to some embodiments of the present disclosure.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In block 1210, the host computer provides user data. In sub-block 1211 (which may be optional) of block 1210, the host computer provides the user data by executing a host application. In block 1220, the host computer initiates a transmission carrying the user data to the UE. In block 1230 (which may be optional), the base station transmits to the UE the user data which was carried in the transmission that the host computer initiated, in accordance with the teachings of the embodiments described throughout this disclosure. In block 1240 (which may also be optional), the UE executes a client application associated with the host application executed by the host computer.

Figure 13:
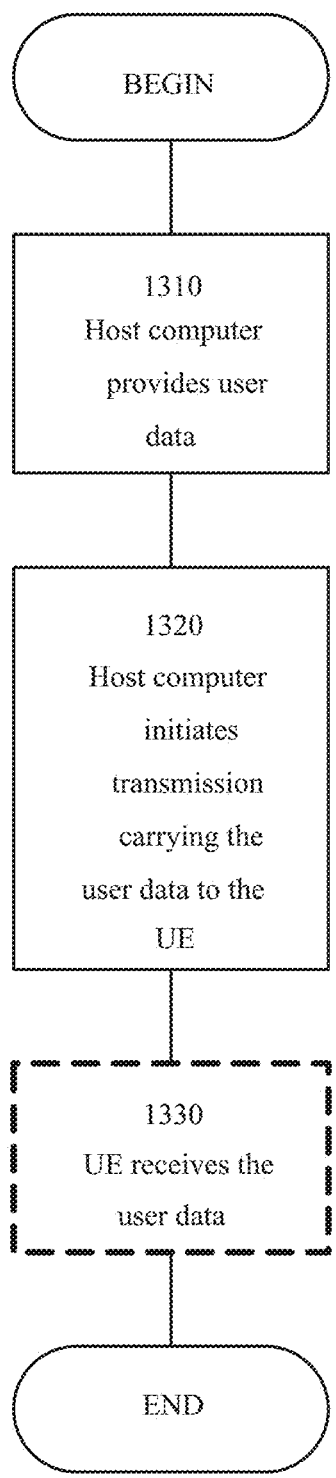
FIG. 13 illustrates a flowchart of methods in a communication system including a host computer, a base station and a user equipment according to some embodiments of the present disclosure.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In block 1310 of the method, the host computer provides user data. In an optional sub-block (not shown) the host computer provides the user data by executing a host application. In block 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
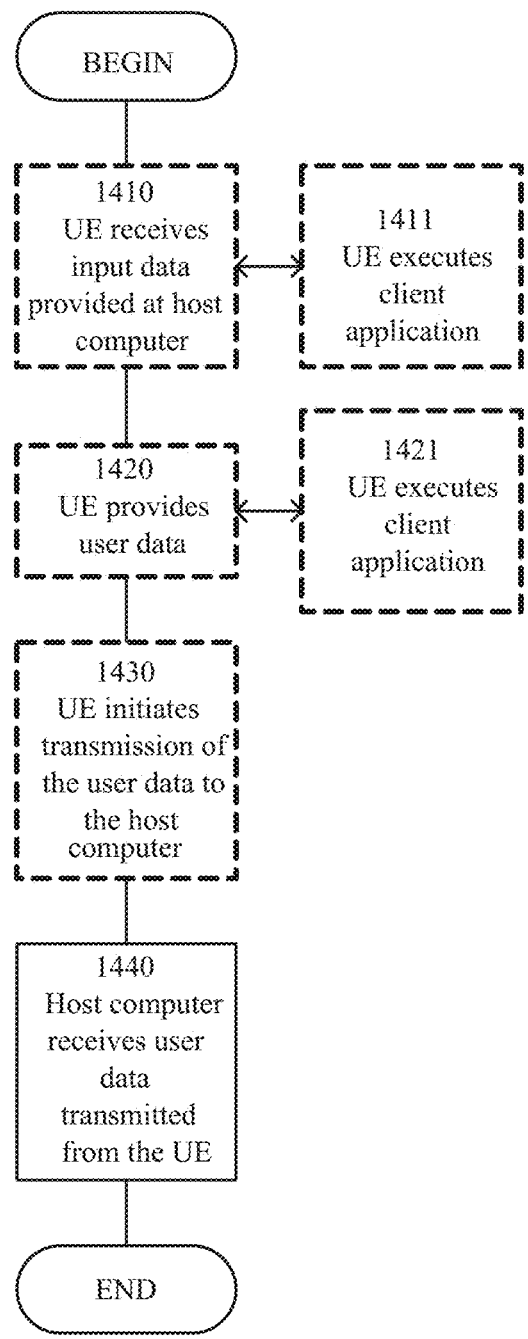
FIG. 14 illustrates a flowchart of methods in a communication system including a host computer, a base station and a user equipment according to some embodiments of the present disclosure.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In block 1410 (Which may be optional), the UE receives input data provided by the host computer. Additionally or alternatively, in block 1420, the UE provides user data. In sub-block 1421 (which may be optional) of block 1420, the UE provides the user data by executing a client application. In sub-block 1411 (which may be optional) of block 1410, the UE executes a client application which provides the user data in reaction to the received input data provided by the host computer. In providing the user data, the executed client application may further consider user input received from the user. Regardless of the specific manner in which the user data was provided, the UE initiates, in sub-block 1430 (which may be optional), transmission of the user data to the host computer. In block 1440 of the method, the host computer receives the user data transmitted from the UE, in accordance with the teachings of the embodiments described throughout this disclosure.

Figure 15:
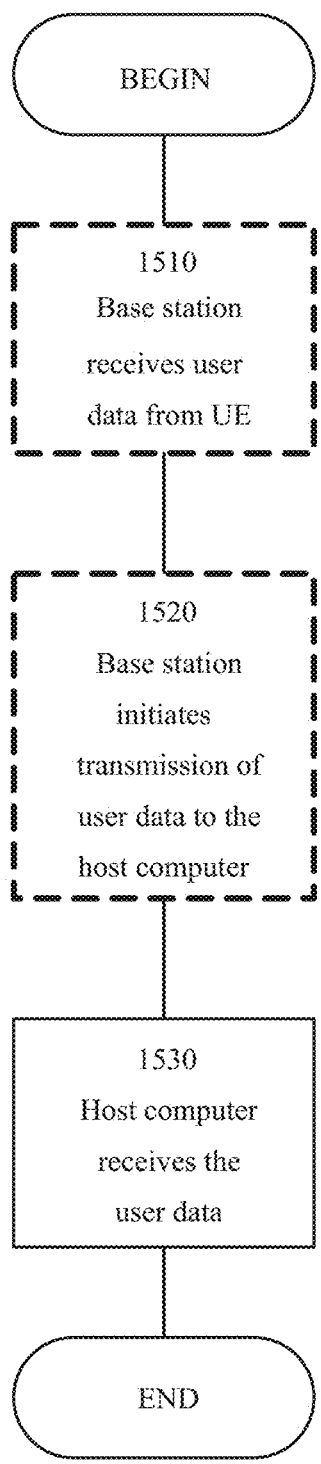
FIG. 15 illustrates a flowchart of methods in a communication system including a host computer, a base station and a user equipment according to some embodiments of the present disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In block 1510 (which may be optional), in accordance with the teachings of the embodiments described throughout this disclosure, the base station receives user data from the UE. In block 1520 (which may be optional), the base station initiates transmission of the received user data to the host computer. In block 1530 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a base station, comprising:
generating a plurality of candidate uplink grants that indicate different frequency resources in an unlicensed spectrum scheduled for uplink transmission of a terminal device, wherein each of the plurality of candidate uplink grants indicates a corresponding frequency resource;

transmitting the plurality of candidate uplink grants to the terminal device simultaneously; and indicating, to the terminal device, a multi-grant selection scheme, which provides a policy for selecting an appropriate uplink grant from the plurality of candidate uplink grants based on one or more of: a total payload size of each of the plurality of candidate uplink grants, a sensed channel power of each of the frequency resources, a transmit power of the terminal device, and buffered data of the terminal device.

2. The method according to claim 1, wherein the multi-grant selection scheme is indicated in radio resource control signaling.

3. The method according to claim 1, wherein each of the plurality of candidate uplink grants is assigned with a priority.

4. The method according to claim 3, wherein each of the plurality of candidate uplink grants comprises a priority indicator indicating the priority.

5. The method according to claim 3, wherein the priority of each of the plurality of candidate uplink grants is indicated by a radio network temporary identifier (RNTI) which is used for transmitting a corresponding candidate uplink grant or by a search space in which the corresponding candidate uplink grant is transmitted.

6. The method according to claim 1, wherein the frequency resources are partly overlapped.

7. The method according to claim 1, wherein each of the frequency resources is represented by a channel.

8. The method according to claim 1 further comprising:
monitoring the uplink transmission based on the plurality of candidate uplink grants.

9. The method according to claim 1 further comprising:
sending, to the terminal device, an indication of enabling or disabling scheduling of the plurality of candidate uplink grants for the uplink transmission.

10. The method according to claim 1 wherein one of the frequency resources, which is scheduled for the terminal device, is also scheduled for at least one other terminal device, and different transmission timings are set for the uplink transmissions of the terminal device and the at least one other terminal device on the one of the frequency resources.

11. The method according to claim 1, wherein selecting the appropriate uplink grant from the plurality of candidate uplink grants is further based on one or more of a radio quality of each of the frequency resources and a channel index of each of the frequency resources.

12. A method implemented at a terminal device, comprising:

receiving a plurality of candidate uplink grants with different frequency resources in an unlicensed spectrum scheduled for uplink transmission, wherein each of the plurality of candidate uplink grants indicates a corresponding frequency resource;

performing a carrier sensing on at least one frequency resource of the plurality of candidate uplink grants, to determine at least one available frequency resource;

receiving a multi-grant selection scheme which provides a policy for selecting one or more appropriate uplink grants from the plurality of candidate uplink grants based on one or more of: a total payload size of each of the plurality of candidate uplink grants, a sensed channel power of each of the frequency resources, a transmit power of the terminal device, and buffered data of the terminal device;

selecting one or more appropriate uplink grants from the plurality of candidate uplink grants with the at least one available frequency resource based on the multi-grant selection scheme; and transmitting data according to the selected one or more appropriate uplink grants.

13. The method according to claim 12 wherein the multi-grant selection scheme is received in radio resource control signaling.

14. The method according to claim 12, wherein the frequency resources are partly overlapped.

15. The method according to claim 12, wherein each of the frequency resources is represented by a channel.

16. The method according to claim 12 further comprising:
receiving an indication of enabling or disabling scheduling of the plurality of candidate uplink grants for the uplink transmission; and
enabling or disabling the scheduling of the plurality of candidate uplink grants based on the indication.

17. An apparatus in a base station, comprising:
a processor; and
a memory, said memory containing instructions executable by said processor, whereby said apparatus is operative to:
generate a plurality of candidate uplink grants that indicate different frequency resources in an unlicensed spectrum scheduled for uplink transmission of a terminal device, wherein each of the plurality of candidate uplink grants indicates a corresponding frequency resource;
transmit the plurality of candidate uplink grants to the terminal device simultaneously; and
indicate, to the terminal device, a multi-grant selection scheme, which provides a policy for selecting an appropriate uplink grant from the plurality of candidate uplink grants based on one or more of: a total payload size of each of the plurality of candidate uplink grants, a sensed channel power of each of the frequency resources, a transmit power of the terminal device, and buffered data of the terminal device.

18. The apparatus according to claim 17 wherein each of the plurality of candidate uplink grants is assigned with a priority.

19. An apparatus in a terminal device, comprising:
a processor; and
a memory, said memory containing instructions executable by said processor, whereby said apparatus is operative to:
receive a plurality of candidate uplink grants with different frequency resources in an unlicensed spectrum scheduled for uplink transmission, wherein each of the plurality of candidate uplink grants indicates a corresponding frequency resource;
perform a carrier sensing on at least one frequency resource of the plurality of candidate uplink grants, to determine at least one available frequency resource;
receive a multi-grant selection scheme which provides a policy for selecting one or more appropriate uplink grants from the plurality of candidate uplink grants based on one or more of: a total payload size of each of the plurality of candidate uplink grants, a sensed channel power of each of the frequency resources, a transmit power of the terminal device, and buffered data of the terminal device;

select one or more appropriate uplink grants from the plurality of candidate uplink grants with the at least one available frequency resource based on the multi-grant selection scheme; and transmit data according to the selected one or more appropriate uplink grants.

20. The apparatus according to claim 19 wherein the apparatus is operative to:

determine a priority of the at least one candidate uplink grant of the plurality of candidate uplink grants; and select the one or more appropriate uplink grants from the at least one candidate uplink grant in a descending order of the priority.

\* \* \* \* \*